Sept. 14, 1954  C. W. ZIMMERMAN  2,689,329
DIELECTRIC WELL LOGGING SYSTEM
Filed Oct. 12, 1950  4 Sheets-Sheet 1

CARL W. ZIMMERMAN
INVENTOR.

BY D. Carl Richards
AGENT

CARL W. ZIMMERMAN
INVENTOR.

BY AGENT

Sept. 14, 1954

C. W. ZIMMERMAN 2,689,329

DIELECTRIC WELL LOGGING SYSTEM

Filed Oct. 12, 1950

CARL W. ZIMMERMAN
INVENTOR.

BY D. Carl Richards
AGENT

Patented Sept. 14, 1954

2,689,329

UNITED STATES PATENT OFFICE 2,689,329

DIELECTRIC WELL LOGGING SYSTEM

Carl W. Zimmerman, Dallas, Tex., assignor, by mesne assignments, to Socony-Vacuum Oil Company, Incorporated, New York, N. Y., a corporation of New York Application October 12, 1950, Serial No. 189,818

13 Claims. (Cl. 324—5)

1

This invention relates to well logging and more particularly to the measurement of variations in the dielectric properties of formations adjacent a well bore.

The study of the formations through which bore holes are driven includes the procurement of samples of material removed during the drilling operation and the analysis thereof plus the measurement of as many properties of those formations in situ as is possible in order accurately to locate mineral bearing or petroleum bearing sections. Logs of self-potential, electrical resistivity, and radioactivity are commercially available and extensively used in the search for subsurface deposits of petroleum and minerals.

The present invention is directed to the study of the dielectric properties of the earth formations. Prior art systems include a method in which an antenna is placed in a well bore and the natural wave length, capacity, and damping factor thereof are ascertained. Measurements thus obtained are related to the dielectric properties of the adjacent formations. It has also been proposed to use a range of forced oscillations applied to an antenna. Variations of the resistance characteristics of the antenna are charted corresponding with the changes in frequency. Since, in the propagation of electromagnetic waves through a conducting medium, the magnetic susceptibility, the dielectric constant, and the electrical resistivity are major factors, the foregoing measurements do not represent variations of the dielectric constant. By the present invention, applicant provides an improvement in dielectric well logging by effectively discriminating against the effects of electrical conductivity and magnetic susceptibility and thereby obtains measurements substantially proportional to changes of the dielectric constant.

In accordance with the present invention, there is provided a system for measuring the dielectric constant of earth formations which comprises a non-conducting exploring unit or sonde having therein an inductance element which forms a part of a high "Q" resonant circuit. A conductive element is connected to the inductance element and upon excitation of the resonant circuit electrostatically couples formations adjacent the sonde to the resonant circuit. Means are provided for detecting variations in the resonance of the resonant circuit as the sonde is moved through the bore hole electrostatically to couple different formations to the resonant circuit.

More specifically, in one form of the invention

2 there is provided at least one pair of elongated metallic elements electrically insulated and spaced one from the other to form a condenser, the size of which is dependent upon the properties of the formations which are immediately adjacent thereto forming in part the dielectric of the condenser. An inductance is connected across the capacitive element to form a high "Q" resonant circuit. By exciting the resonant circuit near its resonant frequency, variations in the dielectric properties of the formations electrostatically coupled to the capacitive element produced rapid phase changes or resonant changes in the resonant circuit that are detected for recordation. In a preferred form, the resonant circuit is included in a phase discriminator network whose output varies directly with variations in resonance of the resonant circuit.

For a more complete understanding of the present invention and for further objects and advantages thereof, reference may now be had to the following description taken in conjunction with the accompanying drawings in which.

Figure 1:
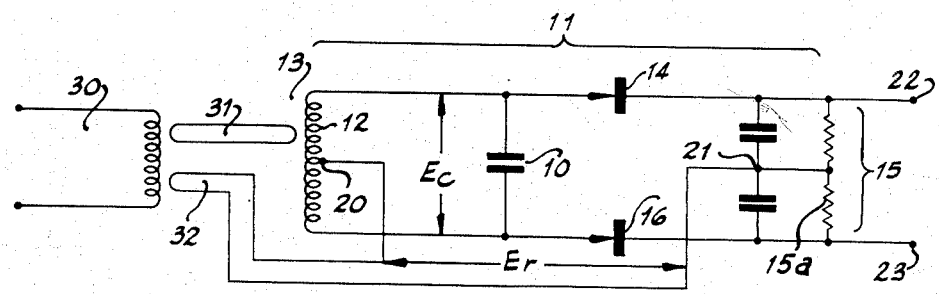
Fig. 1 is a circuit schematically representing elements of the exploring system.

Referring now to Fig. 1, a capacitive element represented diagrammatically by the condenser 10 is to be positioned, in accordance with the present invention, in a bore hole adjacent the formations penetrated thereby in such a manner that the formations form at least in part the dielectric material between the condenser plates. Variations in the capacitance of the condenser 10 are then measured as a direct indication of the variations in the dielectric properties of the earth formations as the condenser 10 is moved along the length of the bore hole.

The schematic diagram of Fig. 1 omits details of construction of the capacitive element 10 but includes the circuit elements with which it is associated in order that the operation of the circuit and manner of detecting variations in the capacitance may be readily understood.

The capacitive element 10 is connected in and forms a part of a phase discriminator bridge 11 of a type generally well understood by those skilled in the art. Such networks are described in Servomechanism Fundamentals by Lauer, Lesnick and Matson (McGraw-Hill, 1947) at pages 206–209. Briefly, however, an alternating current signal $E_c$ is applied across an inductance 12 which may be the secondary winding of a transformer 13. The inductance 12 is connected in series circuit with a first rectifier diode 14, a center-tapped impedance network 15, and a second diode 16 which is poled oppositely to the diode 14 as seen from the inductance 12. A second alternating current signal $E_r$ serving as a reference voltage for the discriminator is applied between a center tap 20 on the inductance 12 and the center tap 21 of the impedance network 15. When the voltages applied to the discriminator 11 are of the same frequency and are spaced in quadrature phase relation, the voltage developed between the output terminals 22 and 23 will be zero. If the phase relation between the voltage is altered from the quadrature phase relation, then a direct current voltage appears across the impedance 15 with a magnitude dependent upon the relative magnitudes of the two input signals and upon the magnitude of the displacement from the quadrature phase relation.

Figure 2:
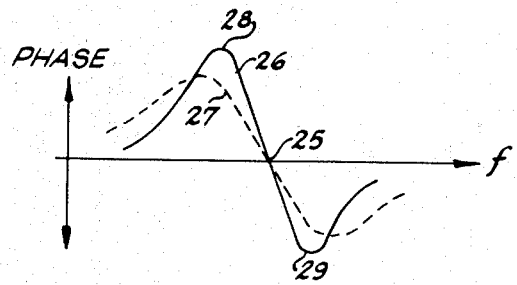
Fig. 2 is a resonance curve for a portion of the circuit of Fig. 1.

The discriminator network is utilized as a means for measuring or detecting variations in the capacitance of the condenser 10. More particularly, the condenser 10 is connected in parallel with the inductance 12 to form a parallel resonant circuit or a tank circuit. Curves of phase versus frequency for a tank circuit have been plotted in Fig. 2 wherein the point 25 is the resonant frequency of the circuit. The solid curve 26 represents the variation in phase of the circuit for one value of "Q" while the dotted curve 27 represents similar variations for a lower value of "Q." It is well understood by those skilled in the art that at a point near resonance the phase characteristic of the tank circuit changes rapidly as illustrated by the slope of curve 26 between the inflection points 28 and 29. The variations in the phase of the voltage across condenser 10 as the tank circuit is operated at and near resonance are dependent upon the dielectric properties of the formations coupled to the condenser 10. Such phase changes are utilized in the discriminator bridge 11 to produce a direct current voltage across the center tapped output resistor 15a of impedance network 15 that may be recorded by surface equipment coupled to the output terminals 22 and 23 to produce a log of variations in dielectric properties.

The resonant circuit comprising capacitance 10 and the inductance 12 may be excited from an alternating current source connected across the terminals of an input circuit 30. The alternating current may be inductively coupled from the circuit 30 by way of a circuit or coupling loop 31 to the inductance 12 where the circuit 31 forms at least in part the primary winding of the transformer 13. A second circuit 32 is utilized as already described to apply the reference voltage $E_r$ between the mid-points 20 and 21 of the bridge network 11.

Figure 3:
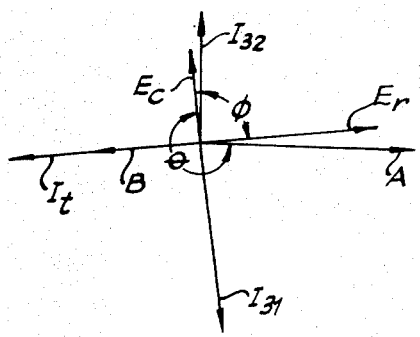
Fig. 3 is a vector diagram of the circuit of Fig. 1 near balance.

As above indicated, the voltages $E_c$ and $E_r$ applied to the bridge network 11 must be in quadrature phase relation if the output voltage is to be zero. As well understood by those skilled in the art, by proper construction and selection of circuit parameters, the system of Fig. 1 may be so adjusted. The vector diagram of Fig. 3 illustrates the circuit operation when balanced for no output voltage at the resistor 15a. The voltages induced in circuits 31 and 32 upon application of alternating current to circuit 30 are "in phase" and may be represented by the vector A. First, consider the voltage applied to the bridge by way of the circuit 31. The impedance in circuit 31 as seen by the voltage represented by vector A is principally inductive so that the current $(I_{31})$ flowing in circuit 31 lags the vector A by almost 90°. Since the transformer 13 has an air core, the voltage induced in the inductance 12 will lag the current $I_{31}$ by 90°. The voltage induced in the inductance 12 is represented by the vector B. Since at the operating frequency the tank circuit formed by the condenser 10 and the inductance 12 is resonant, its impedance is purely resistive and the current $I_t$ flowing therein will be "in phase" with the voltage induced in the inductance 12. The terminal voltage $E_c$ appearing across the condenser 10 and inductance 12 due to flow of current $I_t$ lags the current $I_t$ by 90°. Thus from Fig. 3 it will be seen that the effective voltage $E_c$ in the bridge network 11 due to a voltage induced in the circuit 31 lags the induced voltage by an angle of almost 270°.

The reference voltage $E_r$ effective in the bridge network 11 due to a voltage induced in the circuit 32 may be adjusted to be 90° from the voltage $E_c$. More particularly, the voltage induced in the circuit 32 also represented by the vector A, Fig. 3, works into an impedance that is principally capacitive. As will be explained in connection with Figs. 4 and 5, the capacitive load may be primarily the stray capacity between the leads. However, in event stray capacity is not great enough, a condenser may be placed directly across the circuit 32. In this manner, the current $I_{32}$ may be made to lead the induced voltage vector A by 90°. The phase angle between the current $I_{32}$ and the reference voltage $E_r$ appearing between the center tap points 20 and 21 is controlled by the impedance of the network itself. This impedance is principally capacitive due to the condenser 10 and the condensers forming a part of the center-tapped impedance 15 so that the voltage $E_r$ will lag the current $I_{32}$ by a substantial angle. As illustrated, the angle $\phi$ between the voltage $E_c$ and voltage $E_r$ is 90° and may be adjusted to 90°, if not initially so, by variation of the capacity across the circuit 32 or by the addition of a trimming capacitor in parallel with condenser 10. When adjusted with angle $\phi = 90°$, the voltage across resistor 15 will be zero. As the dielectric of the condenser 10 varies, the angle $\phi$ is also varied to produce a D. C. voltage across resistor 15a dependent in sign and magnitude upon the character of the dielectric material associated with condenser 10.

Figure 4:
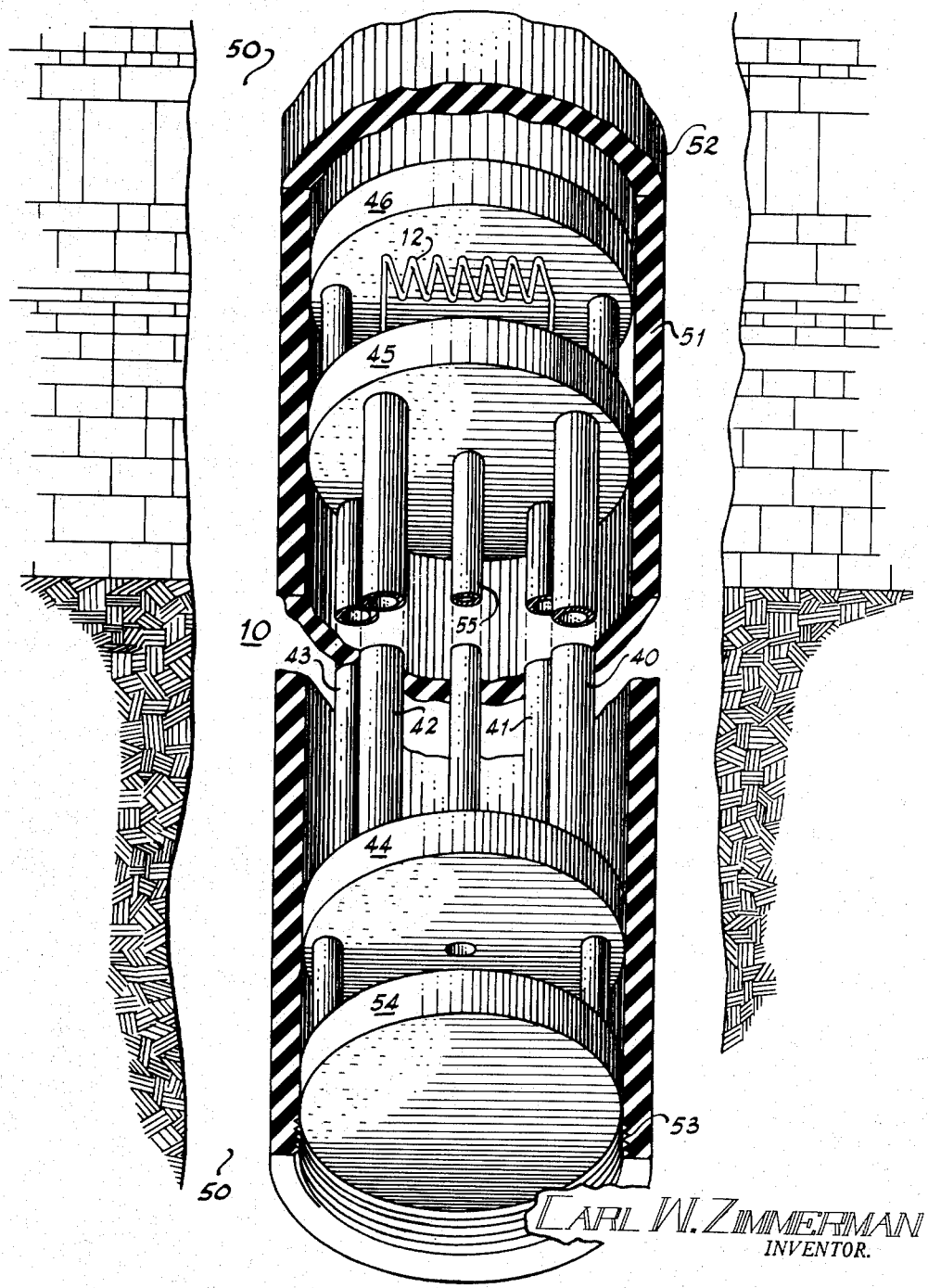
Fig. 4 is a view partially in section illustrating the capacitive element in one form of the present invention.

In Fig. 4 there is illustrated a view partially in section of one form of the capacitive element 10 of the bridge network 11 of Fig. 1 together with the inductance element positioned in and supported by an exploring unit or sonde to be lowered into a well bore. The capacitive element 10 is illustrated as comprising a plurality of elongated metallic members. In Fig. 4, four such metallic members, 40–43, are shown as hollow tubes extending side by side spaced laterally one from the other. They may comprise elongated electrically conductive rods or tubes supported at each end by insulating discs 44 and 45. Where the capacitive element 10 includes four tubes, the tubes 40 and 43 will be interconnected to be electrically common and the tubes 41 and 42 will be similarly interconnected. In general, an even number of members are preferable, and when more than two are utilized they are uniformly disposed about the perimeter of a circle with alternate elements interconnected thereby to form the equivalent of two condenser plates. The inductance 12 carried or supported by members forming a compartment between the disc 45 and an upper disc 46 is electrically connected at its terminals to the condenser plate (the elements 40 and 42). Thus, application of an alternating current to the inductance 12 as by an inductive coupling from a suitable A. C. source as shown in Fig. 1 excites the capacitive element formed by the elongated rods or tubes 40–43. Due to the construction that element is electrostatically coupled to any media adjacent thereto.

The dielectric material between or adjacent the rods comprises the air space within the sonde 51 and the formations adjacent the walls of a well bore 50. Therefore, the dielectric properties of the formations adjacent the well bore will determine at least in substantial part the capacitance of the condenser 10. As the unit is moved along the length of a well bore, substantially the only variation in the dielectric of the condenser 10 will be variations in the dielectric constant of the bore hole fluid and of the earth formations. Such variations principally occur in the earth formations and thus produce variations in the capacitance of condenser 10 which can be measured as representative of the magnitude of the earth parameter desired.

The capacitive element 10 is movably supported in the bore hole and is insulated from moisture or fluids in the bore hole by a housing or enclosure 51 forming at least a part of the exploring sonde which prevents unwanted conductive dissipation in the circuit and thus aids maintenance of a high "Q." Direct contact of the element 10 with bore hole fluids would reduce the "Q" of the tuned circuit to the extent that a phase-frequency curve (such as Fig. 2) would have little if any slope. Such an arrangement would be insensitive to capacitive changes.

Further in accordance with the invention, the casing 51 must be non-conductive in the portion adjacent the reference character 10 of Fig. 4 and preferably to beyond that portion of the sonde indicated by the reference character 52 in order to permit extension of the electrostatic lines of force into the formations. This portion of the casing may be formed of a reinforced phenol condensation product sold under the trade name of "Micarta," or other such non-conducting material of sufficient strength to withstand pressures encountered in deep well bores.

The lower end of the sonde may be closed or sealed by a plug (not shown) which threadedly engages the lower end 53. The rectifiers 14 and 16 and the impedance network 15 of Fig. 1 may conveniently be housed between the discs 44 and 54 supported at the lower ends of the rods 40–43. A tube 55 extending along the axis of the housing 51 and between discs 44 and 45 may be used both to aid in the support of the structure and as a conduit for the necessary conductors leading from the terminals 21, 22 and 23 of Fig. 1 to the upper portion of the sonde and thence to surface measuring equipment by way of a supporting cable.

Figure 5:
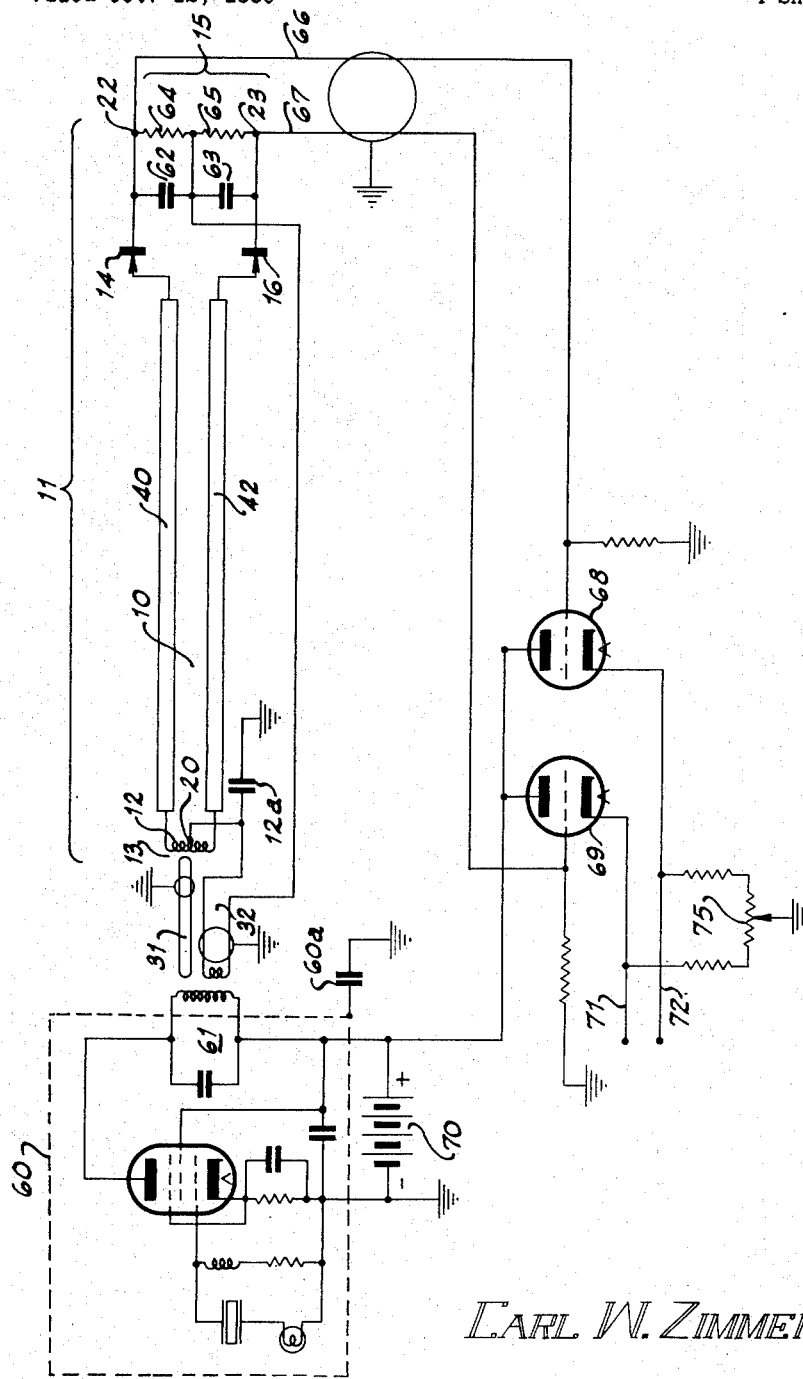
Fig. 5 is a more detailed circuit diagram of the invention.

In Fig. 5 there is illustrated a circuit diagram in which the two elements 40 and 42 form the condenser 10. In this system a crystal oscillator 60 operating preferably at relatively high frequencies (in the order of 10 to 20 megacycles) produces a voltage at the output or plate tank circuit 61 for application to the phase discriminator network 11. The dotted outline extending around the oscillator 60 represents shielding which together with the indicated shields encircling the links 31 and 32 prevents stray coupling. The shielding around the oscillator 60 preferably is grounded by way of a relatively large capacitor 60a to a metallic portion forming together with the insulating tube 51 of Fig. 4 a part of the exploring sonde or is connected to the strain member forming a part of the cable which supports the sonde in the well bore. The center tap 20 on inductance 12 is also grounded to the same point by a capacitor 12a. In this manner all metallic parts of the oscillator and the exploring sonde itself are maintained at the same potential with reference to alternating current as the center tap on the inductance 12.

The link 31 loosely couples the inductance 12 to the tank circuit 61 of oscillator 60 and may be a single turn loop coupled to each of the associated windings. The inductance or winding 12 is connected at or near its extremities to the elongated network elements 40 and 42 forming the condenser 10. The rectifiers 14 and 16 connected to the ends of the elements 40 and 42 of condenser 10 work into the smoothing impedance network 15 which includes condensers 62 and 63 Currents flowing through rectifiers 14 and 16 place charges upon condenser 62 and 63 which leak off by way of resistors 64 and 65.

The voltage across the extremities of resistors 64 and 65, i. e., the voltage appearing between output terminals 22 and 23, is fed by way of shielded conductors 66 and 67 to a balanced D. C. amplifier which includes triodes 68 and 69. The D. C. amplifier is provided to couple the relatively high impedance network 15 to a low impedance line or cable including conductors 71 and 72 which extend uphole to surface instruments. The triodes 68 and 69 may be operated from the same "B" supply as the crystal oscillator 60, the plates being coupled directly together and to the B+ terminal of the B-battery 70. The battery 70 may be positioned either at the surface or in the bore hole. For convenience, if sufficient cable conductors are available, it will be found preferable to locate the battery 70 at the earth's surface.

The cathodes of the tubes 68 and 69 are connected by way of a circuit including conductors 71 and 72, which may be elements of the elongated cable (not shown) used for supporting the exploring sonde, to surface measuring and recording equipment. Variations in the D. C. level of the grids of triodes 68 and 69 will determine the potential between the cathode leads 71 and 72. Thus, variations in the phase of the voltage appearing across the condenser 10 as the resonant frequency of the parallel circuit changes due to movement of condenser 10 past formations of differing dielectric properties produce between the conductors 71 and 72 a D. C. voltage proportional to the variation in dielectric properties. This voltage is then transmitted over the cable supporting the exploring unit or logging tool in the well bore to the earth's surface where it may be measured or recorded in conventional manner. The variations of the dielectric properties of the earth may thus be displayed in correlation with depth of bore hole on an elongated chart for use in determining the lithology of the subsurface formations.

In order to place the instrument in operation, the following design considerations and operating instructions should be followed. The frequency of operation preferably will be selected in the megacycle range. Propagation of electromagnetic waves in a medium depends upon the dielectric constant, the conductivity and the magnetic susceptibility of the medium. The frequency of operation of the device of the present invention will be selected to be high enough so that the effects of magnetic susceptibility are negligible compared to the effects of the dielectric constant and yet low enough to obtain desired penetration into the formations adjacent the well bore. At frequencies of the order of 10 to 20 megacycles the conductivity effects are substantially of the same order of magnitude as the dielectric effects for comparable changes in both parameters but susceptibility effects are very small in comparison to either. However, the effect of conductivity in the present invention is minimized by utilizing measurements of variations in resonance of a tuned circuit in which the "Q" is maintained at a relatively high level. In other words, a frequency is selected to eliminate susceptibility, and the phase characteristic of a resonant circuit having a high "Q" is utilized to discriminate between dielectric and conductivity effects. Of course, as the frequency of operation is made higher, the dielectric effects become increasingly predominant in the propagation of the electromagnetic waves even as compared to conductivity but penetration is more limited.

When the operating frequency is selected, preferably above a megacycle, the circuit including the condenser 10 and the inductance 12 will then be constructed or adjusted to have a resonant frequency above the operating frequency. Preferably, the alternating current will have a frequency which is at or just slightly higher than the frequency of the inflection point 28 of the phase curve of Fig. 2 when the resonant circuit is in air. The condenser 10 in air will have a lower capacity than during its travel throughout the length of the bore hole since the material therein always has a higher relative dielectric constant than air. Thus, when in the presence of formations having a higher dielectric constant than air, the point 25 of Fig. 2 effectively will be moved to the left and down frequency toward the frequency of the alternating current used to excite the resonant circuit. The variations in the dielectric constant of materials that might be encountered extends over a considerable range. The relative dielectric constant of air is unity whereas water has probably the highest relative dielectric constant of any materials ordinarily encountered, the dielectric of water being in the order of eighty with shales intermediate, in the order of ten to fifty. The circuit constants will be adjusted, particularly the dissipative elements, so that any variations in the dielectric constants of the formations encountered will not shift the resonant curve of Fig. 2 to the left to a point beyond which the alternating current frequency would be above the inflection point 29. This, of course, is controlled by varying the "Q" of the resonant circuit as, for example, by connecting a resistor across the terminals of the coil 12. Preferably the "Q" of the circuit will be maintained above 10.

With a system constructed and adjusted as indicated, the tap on the potentiometer 75 of Fig. 5 which forms a part of the cathode impedance for the tubes 68 and 69 will be adjusted so that the voltage appearing between the leads 71 and 72 is zero for a selected medium adjacent the condenser 10. The instrument may then be lowered into the well bore whereupon the variations in the voltage appearing between the leads 71 and 72 will be produced and controlled by variations in the dielectric properties of the formations along the bore hole as reflected by the electrostatic coupling between the elements of condenser 10 and the formations adjacent thereto.

In the form of the invention illustrated in Fig. 4, the four elements 40–43 of ⅜ inch copper tubes approximately two feet long were positioned with their axes at the corners of a square 1⅞ inches per side. The inductance 12 was formed of seven turns of No. 14 copper wire approximately ½ inch in diameter and formed with the condenser 10 a circuit resonating at approximately 14.55 megacycles. The conductive elements were supported at each end by insulating discs and the condenser itself was encased in a laminated insulating tube having a wall thickness of approximately ½ inch. The crystal oscillator shown in Fig. 5 for driving the resonant circuit operated at a frequency of approximately 14.50 megacycles.

Figure 6:
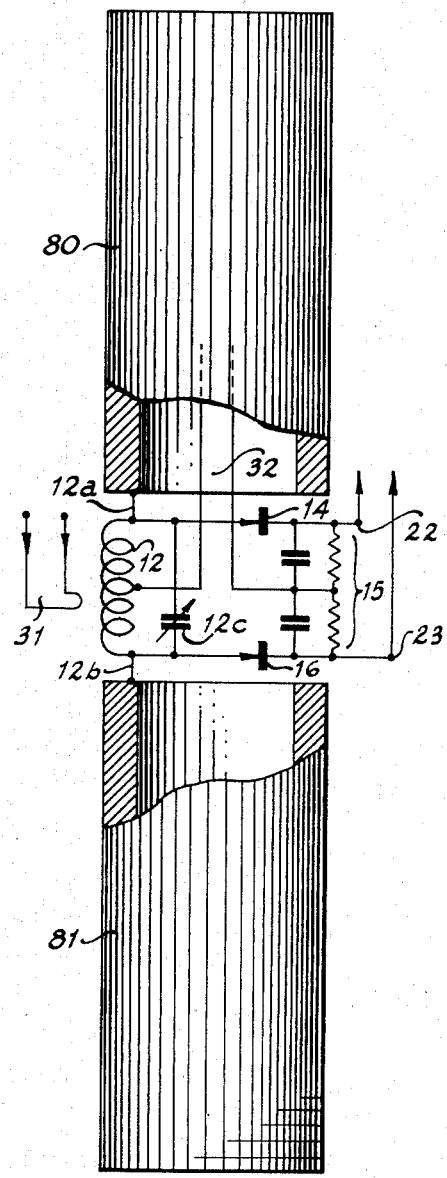
Fig. 6 illustrates a modification of the invention.

In Fig. 6 there is schematically illustrated a modification of the invention in which a dipole is utilized electrostatically to couple the formations to the exploring unit rather than the capacitive element 10 of the construction shown in Figs. 1, 4 and 5. Where consistent, parts have been given the same reference characters in Fig. 6 as in Fig. 1. In this system, the inductance 12 is connected at the extremity 12a to a metallic cylinder 80 and at the extremity 12b to a similar cylinder 81. A padding condenser 12c is connected across the terminals of the inductance 12. As in the case of Fig. 1, the inductance 12 forms a part of the phase detecting network which includes the rectifiers 14 and 16 and the center-tapped impedance network 15. Upon application of an alternating current to the input circuit 31, an electric field is set up between the metallic cylinders 80 and 81. The lines of force lying in vertically radial planes radiating from the axis of the dipole extend into the formations electrostatically to couple the formations to the phase detecting bridge. In effect, the cylinders 80 and 81 form a dipole antenna driven at its center (i. e., at the juxtaposed ends of cylinders 80 and 81) by excitation of the inductance 12 as coupled to the input circuit 31.

Preferably the cylinders 80 and 81 are made as large in diameter as may be utilized with or inserted into the housing in which they are supported. The housing has been omitted in Fig. 6 but may be substantially the same as the insulating tube 51 of Fig. 4. In this modification of the invention, the total length of the dipole formed by the elements 80 and 81 must be short compared to a wave length of the electromagnetic waves in the adjacent medium if variations in resistivity of the medium are not to affect the output voltages. More particularly, at a frequency of 14.5 megacycles an electromagnetic wave in shales having a resistivity of 10 ohm feet has a wave length of the order of 9 feet, the wave length being primarily dependent upon electrical resistivity. Earth resistivities ordinarily encountered will vary upwards from slightly below 10 ohm-meters and thus the length of the dipole may be fixed in relation to the foregoing wave length. A dipole having a total length in the order of one foot is satisfactory. Since the dipole is maintained at less than a quarter wave length, it will appear to be inductive as seen by the exciting coil or inductance 12. It is therefore necessary to include a conventional condenser 12c connected across the inductance 12 to produce resonance at just above the operating frequency. Variations in the dielectric constant of formations adjacent the dipole will then produce variations in the inductance of the resonant circuit which will shift the resonant frequency thereof relative to the exciting frequency to produce variations in the output voltage across the impedance 15.

While the invention has been illustrated and described with such particularity as to enable one skilled in the art to make and use the same, it is to be understood that modifications will now suggest themselves to those skilled in the art, and it is intended to embrace such modifications as fall within the scope of the appended claims.

What is claimed is:

1. A sensing system for dielectric well logging comprising at least one pair of elongated conductive elements laterally spaced one from the other, an inductance positioned at adjacent corresponding ends of said elements and connected therebetween to form a parallel resonant circuit, means for exciting said resonant circuit at a frequency near the resonant frequency thereof, rectifiers oppositely poled with respect to excitation of said inductances and connected to each of said conductive elements at the end of said elements opposite said inductance, a center tapped impedance network connected between said rectifiers on the side thereof opposite said parallel resonant circuit, means for applying a reference voltage between a central point on said impedance and the center of said inductance that is in phase quadrature with the excitation of said parallel resonant circuit, means for detecting variations in the voltage across said impedance, and structure for movably supporting said conductive elements in a well bore adjacent the earth formations to couple said formations to said parallel circuit through electrostatic lines of force extending into said formations for the production of signals across said impedance proportional to the variations in the dielectric properties of formations adjacent said well bore.

2. In a system including an insulating exploring housing movably positioned in a well bore, the combination which comprises a phase detector network having input terminals at the primary of a transformer and having output terminals, a capacitive element connected across the secondary winding of said transformer to form a parallel resonant circuit, a source of alternating current connected to said primary winding for exciting said resonant circuit at a frequency near the resonant frequency thereof, means for mounting said detector network in said housing with said capacitive element supported adjacent formations penetrated by said well bore to couple said formations to said network by electrostatic lines of force extending through the walls of said housing into said formations and means connected to said output terminals for measuring variations in the resonance of said resonant circuit as said housing is moved along said well bore to couple formations of different dielectric properties to said network.

3. A system for logging variations in the dielectric properties of formations adjacent a well bore which comprises a phase discriminator network including an inductance element and having two sets of input terminals and one set of output terminals, a capacitance having elongated conductive elements disposed in a formation facing relationship connected in circuit with said inductance to form a resonant circuit, an insulating housing enclosing said network in fluid tight relation and supporting said network with said capacitance for movement in said well bore, means for exciting said network at a first set of said input terminals to produce in said inductance instananeously unidirectional flow of alternating current having a frequency near the resonant frequency of said resonant circuit electrostatically to couple formations adjacent said capacitance to said network, means for applying alternating current to the second set of said input terminals to produce in said inductance instantaneously opposed current in opposite halves thereof having the same frequency as the current applied to said first input terminals but displaced substantially in quadrature phase therefrom and means connected to said output terminals for measuring variations in the resonance of said resonant circuit as different formations along the length of said well bore are electrostatically coupled to said capacitance.

4. In a system for logging variations in the dielectric properties of formations adjacent a well bore the combination which comprises a bridge network having adjacent arms thereof formed by a center tapped inductance element, a series circuit forming the remaining arms of said bridge and including two oppositely poled rectifiers connected to said inductance and a center tapped impedance, a capacitance comprising conductive elements disposed in a spaced apart relationship and connected in parallel to said inductance to form a resonant circuit, a housing for said bridge network of electrically insulating material to prevent conductive contact with bore hole fluids, means for exciting said bridge across the diagonal defined by the extremities of said inductance electrostatically to couple media adjacent said bridge and outside said housing to said capacitive element, means for applying a reference alternating current between the center taps of said inductance and of said impedance substantially in quadrature phase relation to said exciting alternating current for producing an output signal across said impedance proportional to variations in resonance of said resonant circuit, and means for detecting said output signal.

5. A dielectric well logging system comprising two conductive elements forming a dipole, a high "Q" parallel resonant circuit including an inductance connected between the juxtaposed ends of said element, a source of alternating current coupled to said inductance for exciting said dipole at a frequency near the resonant frequency of said resonant circuit, means for preventing change in the "Q" of said circuit upon conductive dissipation due to moisture or liquid in a well bore comprising insulating structure supporting said dipole for movement in a well bore with said elements electrostatically coupled to formations adjacent said well bore, and means for measuring variations in resonance of said resonant circuit as said structure is moved along the length of said well bore.

6. In a dielectric well logging system the combination comprising a pair of metallic cylinders positioned spaced apart with their axes substantially co-axial, an inductance connected between the juxtaposed ends of said cylinders, a source of alternating current coupled to said inductance for exciting said cylinders as elements of a radiating dipole, means for resonating said inductance at a frequency near the frequency of said alternating current, insulating structure supporting said cylinders and said inductance for movement in a well bore electrostatically to couple formations adjacent said well bore through said dipole to said resonant circuit, and means for measuring variations in resonance of said resonant circuit as said structure is moved along the length of said well bore.

7. A circuit for measuring dielectric properties of a medium which comprises a pair of spaced apart conductive elements forming a capacitive element in which said medium forms at least a part of the dielectric thereof, an inductance connected between the conductive elements to form a parallel resonant circuit, an insulating structure for housing said elements and said inductance and for supporting said elements in or adjacent said medium with both of said conductive elements facing said medium outside said housing and adapted to exclude bore hole fluids from contacting said elements, means for exciting said conductive elements at a frequency near the resonant frequency of said resonant circuit electrostatically to couple said medium outside said insulating structure to said conductive elements, and means for measuring the phase angle between the excitation of said conductive elements and the voltage thereacross at and near resonance as a measure of the dielectric of said medium.

8. A system for measuring variations in the dielectric properties of a medium which comprises an elongated insulating housing, at least one pair of elongated conductive elements in said housing laterally spaced one from the other to form a capacitance in which said medium at least in part comprises the dielectric thereof, an inductance positioned at one end of said housing adjacent the ends of said elements and connected therebetween to form a parallel resonant circuit, a source of alternating current having a frequency near the resonant frequency of said resonant circuit, means for coupling said source to said inductance for exciting said resonant circuit, oppositely poled rectifiers at the other end of said housing connected to said conductive elements at the ends thereof opposite said inductance, a center tapped impedance network connected between said rectifiers on the side thereof opposite said conductive elements, means for applying a reference voltage at the frequency of said alternating current between the central point on said impedance and a central point on said inductance in phase quadrature with said alternating current, and means for detecting the voltage across said impedance.

9. A well logging system comprising an elongated insulating exploring enclosure movably positioned in a well bore, a pair of elongated spaced apart conductive elements both of which are disposed in and extend lengthwise along said enclosure in a formation facing relationship, an inductance connected between and to adjacent ends of said elements and forming with said elements a parallel resonant circuit, means for exciting said conductive elements at a frequency near the resonant frequency of said resonant circuit electrostatically to couple formations along the length of said enclosure to said conductive elements in their formation facing relationship, and means connected across the terminals of said inductance for measuring variations in the resonance of said resonant circuit as said enclosure is moved along said well bore to couple formations of different dielectric properties to said network.

10. A well logging system comprising an elongated insulating exploring enclosure movably positioned in a well bore the combination which comprises a plurality of elongated conductive elements extending lengthwise of said enclosure side by side in a spaced apart formation facing relation, an inductance connected between said conductive elements to form a high "Q" parallel resonant circuit therewith, a source of alternating current having a frequency near the resonant frequency of said resonant circuit and coupled to said resonant circuit electrostatically to couple earth formations to said plurality of conductive elements by electrostatic lines of force extending through the walls of said enclosure into said formations, and means for measuring variations in resonance of said resonant circuit as said enclosure is moved along the length of said well bore.

11. A well logging system comprising an insulating exploring enclosure adapted to be movably positioned in a well bore, an even number of elongated conductive elements disposed in said enclosure in a side by side spaced apart relation in a circular configuration with their axes parallel to the axis of said enclosure, a phase detecting network including an inductance and a source of excitation for said inductance, means for electrically interconnecting adjacent ends of alternate ones of said conductive elements to one terminal of said inductance and the adjacent ends of the remaining conductive elements to the other terminal of said inductance to form in said phase detecting network a high "Q" resonant circuit, and means connected between the opposite ends of said two sets of conductive elements for measuring variations in the resonances of said resonant circuit as said enclosure travels through said well bore electrostatically coupled to formations adjacent thereto.

12. A dielectric well logging system comprising a sensing device including an inductance having terminals for application thereto of an exciting alternating current, a plurality of elongated linear conductive elements extending side by side in a spaced relation laterally one from the other, means electrically interconnecting a selected portion of said plurality of elements to one terminal of said inductance and for connecting the remaining portion of said plurality of elements to the other terminal of said inductance to form a parallel resonant circuit in which said elements comprise the capacitive portion thereof, an elongated non-conductive cylinder forming a liquid tight enclosure encasing said conductive elements, and insulation structures at each end of said elements for rigidly supporting said elements in said spaced relation in said housing whereby media adjacent said conductive elements within and without said enclosure form the dielectric therebetween and control in part the capacitance thereof.

13. A logging system comprising a liquid tight insulating exploring enclosure movably positioned in a well bore, a phase detector network having input terminals at the primary of a transformer and having output terminals, an elongated capacitive element connected across the secondary winding of said transformer to form a parallel resonant circuit, a source of alternating current connected to said primary winding for exciting said resonant circuit at a frequency near the resonant frequency thereof, means for mounting said detector network in said enclosure with said elongated capacitive element supported parallel to the axis of said enclosure adjacent formations penetrated by said well bore to couple an elongated section of said formations to said network by electrostatic lines of force extending through the walls of said enclosure into said formations, and means connected to said output terminals for detecting variations in the resonance of said resonant circuit as said enclosure is moved along said well bore to couple formations of different dielectric properties to said network.

References Cited in the file of this patent

UNITED STATES PATENTS

| Number | Name | Date |
|---|---|---|
| 1,984,166 | Walter | Dec. 11, 1934 |
| 2,204,196 | Straatman | June 11, 1940 |
| 2,339,663 | Teare | Jan. 18, 1944 |
| 2,373,846 | Olken | Apr. 17, 1945 |
| 2,390,409 | Aiken | Dec. 4, 1945 |
| 2,393,009 | Chun | Jan. 15, 1946 |
| 2,440,693 | Lee | May 4, 1948 |
| 2,454,102 | Stacy | Nov. 16, 1948 |
| 2,512,879 | Roggenstein | June 27, 1950 |
| 2,535,027 | Anderson | Dec. 26, 1950 |